Figure 1:
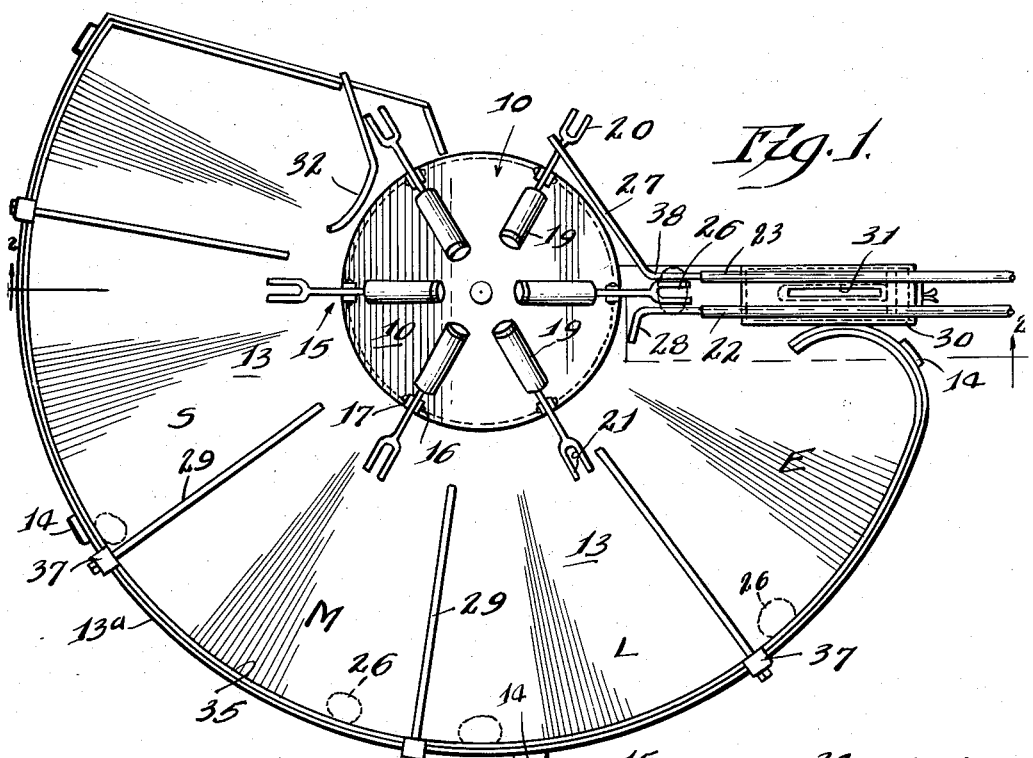

Sept. 19, 1961  G. L. KITSON  3,000,500
EGG GRADER
Filed Dec. 24, 1956

Inventor:
Gerald L. Kitson.
By. Everett A. Johnson
Attorney.

United States Patent Office 3,000,500
Patented Sept. 19, 1961

3,000,500
EGG GRADER
Gerald L. Kitson, Rte. 3, Rockford, Mich.
Filed Dec. 24, 1956, Ser. No. 630,182
10 Claims. (Cl. 209—121)

This invention relates to an apparatus for automatically grading eggs and more particularly is directed to an apparatus for grading eggs delivered to the grader on a conveyor belt.

Heretofore many types of egg graders have been proposed but they have been unsatisfactory for one reason or another. For example, many graders involve a number of individual scales which are expensive and require considerable manual handling of the eggs being graded. Likewise apparatus heretofore available has not been readily adjustable with respect to the grading weights.

It is therefore a primary object of my invention to provide an apparatus which is rugged, is of simple construction, and is readily adjustable and hence versatile. A further object of the invention is to provide an inexpensive apparatus which is particularly suited for the continuous and automatic grading of eggs delivered to the grader by a conveyor system. Still another object of the invention is to provide an apparatus which does not require the attention of skilled operators. These and other objects of my invention will become apparent as the description thereof proceeds.

Briefly, I attain the objects of the invention by providing a rotating platform which is inclined from the horizontal. Below the rotating platform and adjacent thereto I provide a stationary but adjustable table, likewise inclined from the horizontal and having a plurality of adjustably divided sections, each section comprising a grading station and collecting one of the desired weight grades.

On the rotated platform I mount a number of radially extending balances of the beam type. Each includes a journaled fulcrum adjacent the periphery of the rotated platform. The beam of each balance has a liquid-filled counterweight at one end and the article-carrying fork at the other. The counterweight can be adjusted by adding or removing liquid ballast and the effective lever arm changes as the platform rotates.

Adjacent the high point in the path of the rotating tilted platform I provide an egg delivery ramp which receives articles such as eggs from a conveyor belt system. The ramp comprises a pair of spaced rails which are upturned at their lower ends to retard the rolling egg until it is picked up by the fork on the balance.

As the platform is rotated, the fork end of a balance is depressed by a cam bar to bring it beneath the lower end of the ramp. When in alignment with the ramp and with the fork wholly between the rails of the ramp, the balance is released by the cam bar and the counterweight causes the fork to be raised and lift the next egg from the ramp. In its initial rotation from the ramp, the balance carrying the egg is supported by a bar extension of the ramp. However, as the platform is further rotated to bring the balance beyond the stabilizing bar, the effective lever arm of each balance decreases by shifting the fluid ballast and, when the weight of the egg is sufficient to overcome the counterweight, the egg falls from the downwardly tilted fork onto the appropriate section of the grading table. The egg having been discharged, the balance resumes its radial position with the counterweight returning to the face of the rotated platform. When the balance reaches a point near the loading ramp, the outer fork end of the balance is depressed and guided below the ramp to pick up the next egg. In the event that an egg has been too light in weight to be discharged onto a prior grading bin, it is removed from the fork when tilted downwardly by a trip bar at the final grading bin.

Figure 2:
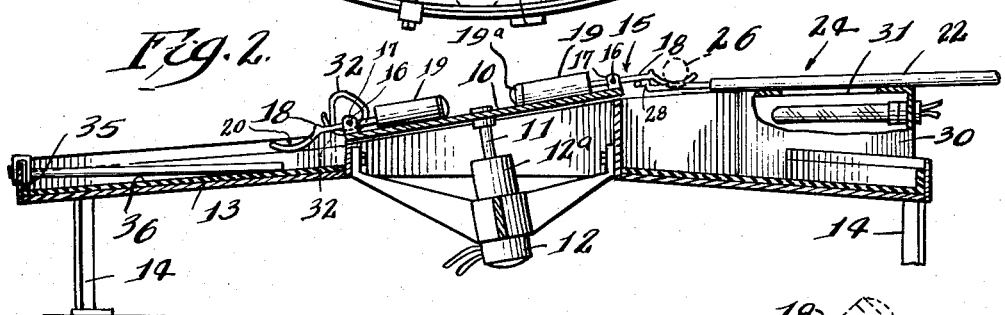
Figure 3:
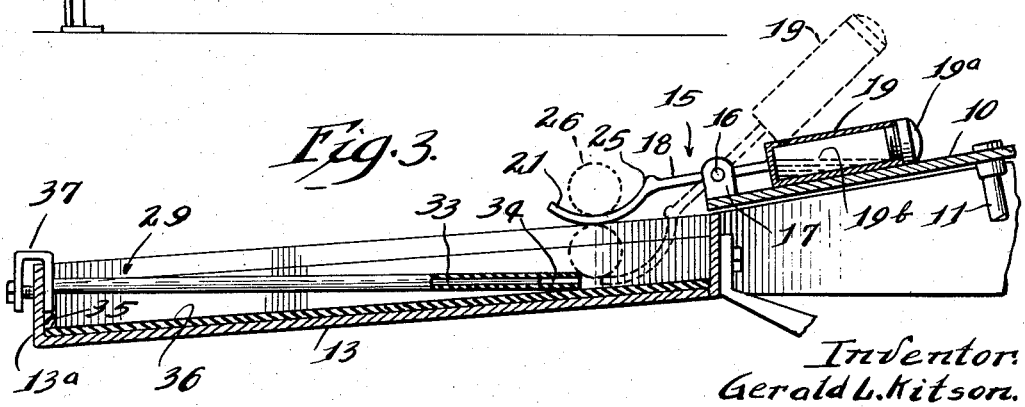

Further details of construction and advantages of the apparatus will be described by reference to an embodiment of the invention illustrated in the accompanying drawings and wherein:

FIGURE 1 is a plan view of the assembly;
FIGURE 2 is a side elevation thereof; and
FIGURE 3 is an enlarged view of the grading table showing an adjustable divider member and an individual balance.

Referring to the drawing, the rotatable platform or table 10 is mounted on inclined drive shaft 11 which is rotated by motor 12 through speed reducer 12a. The shaft 11 extends upwardly of the inclined grading table 13 which is supported by legs 14 and is arranged to slope outwardly toward egg stop rim 13a. The rotated platform 10 is tilted at an angle of about 10 to 15°, more tilt causing heavy eggs to drop off sooner and light eggs to stay on longer.

At the periphery of rotated platform 10 are arranged a number of balances 15, each comprising a rod or arm 18, pivoted on pin 16 between pillow blocks 17, and a hollow counterweight 19 containing a selected quantity of a weighting fluid 19b.

The balances 15 are all arranged to extend radially of the shaft 11 and tilted table 10. The rods 18 are free to tilt about pins 16 from a plane which is substantially parallel to the plane of rotation of the platform 10 to a position wherein the rods 18 are inclined at a substantial angle to such plane of rotation. Likewise, the extent of tilt will vary with the weight of the counter balance 19 and with the rotational position of any given balance which affects the true lever arm of the fluid weight in the balance.

The counter balance 19 includes a closed hollow chamber provided with a cap 19a and a quantity of the weighting fluid 19b. Inasmuch as the grader may be used at low temperatures, it is preferred that the weighting or ballast liquid be non-freezing. Also, since it is desired that the discharge of the egg be rapid and within a relatively short travel of the periphery of platform 10, the ballast liquid is free-flowing and preferably of low viscosity so that when the counterweight 19 is overbalanced by the egg there will immediately be a rapid shifting of the ballast thereby accelerating the discharge of the egg and the restoring of the balance 15 to its "at rest" position as the empty balance is rotated about the shaft 11. A suitable liquid is oil, water, mercury, or the like.

The fork 20 is carried by one end of the rod 18 and may include a pair of spaced tines 21 having a span which is less than the spacing of the inclined rods 22 and 23 which form the inclined ramp 24. A candling box 30 having a light source and a light slot 31 may be aligned below the ramp 24 so that the eggs can be scanned by the operator and any defective eggs removed.

As the platform 10 is rotated, the rod 18 of a balance 15 is depressed by cam bar 27 comprising an extension of rail 23 in the ramp 24. In this way the fork 20 is lowered so that it can pass below rod 23 and upwardly between rods 22—23 and lift an egg 26 from the ramp 24. After passing from the ramp 24, the loaded fork 20 is raised by stabilizing bar 28 which holds the balance 15 steady until the weighting liquid 19b in the counterweight 19 is quiet or stable after picking up the egg 26 from the delivery end of the ramp 24.

The base or heel 25 of the fork 20 provides an egg stop and the tines 21 are curved upwardly to provide a spoon-like cradle for the eggs 26. However, when the fork 20 is tilted substantially below the plane of the rotated platform 10, the egg 26 is gently rolled from the fork 20 onto the adjacent section E, L, M, or S of the grading table 13.

The compartments or stations of the grading table 13 are adjustable by moving the dividers 29. The outer rim or egg stop 13a of the table 13 may be provided with 0.5 inch sponge rubber bumper 35 to protect the rolling egg and likewise the floor of the grading table is covered with a resilient pad, such as sponge rubber, 36. A smooth plastic sheet or the like can be used to cover the pad 36 to make it easy to keep clean. The grading table 13 slants down about 1 inch per foot.

It will be appreciated that whereas a particular egg is balanced by the counterweight 19 when the platform 10 is adjacent the delivery station and the counterweighting fluid has its maximum lever arm, the continued rotation of the platform 10 will change the effective lever arm until the weight of the egg 26 is sufficient to tilt the balance 15 and discharge the egg from the fork 20. The heaviest eggs will be discharged first and the light weight eggs will have their last opportunity to trip the counter balance 19 when the liquid weighting material 19b is nearest the fork 20.

As each egg progresses about the platform 10, the fluid 19b in the counterweight 19 gradually moves to the end of the chamber 19 nearest the fork 20, thereby allowing the progressively lighter eggs to drop off into the appropriate grading station. The cull eggs are tipped from the fork 20 by the cam bar 32 and are collected in the last grading station.

The partitions 29 between the stations are comprised of rods 33 with rubber tubing 34 over the rods and adjustable U-clamps 37 which engage the rim 13a. The rubber tubing 34 is longer than the rods 33 and protects the eggs from the ends of the rods.

In a typical apparatus according to my invention, the counter weight 19 is a cylinder about 5 inches long and 1 inch in diameter. It is closed at one end by cap 19a and contains about 2.5 oz. of weighting fluid 19b. The arm or rod 18 is 0.25 inch stock about 4 inches long with one end fixed to the counterweight 19 and the other to fork 20. The fulcrum pin 16 is about 1 inch from the container 19 and about 3 inches from the fork 20. The rotatable table 10 is about 16 inches in diameter and is rotated on shaft 11 by motor 12 and speed reducing gear 12a at approximately 6 r.p.m. At this speed about six cases of eggs, each containing 30 doz., can be candled and graded per hour.

When eggs arrive at the lower end of ramp 24 they are held by the rise in the ramp bars 22 and 23 at 38 until picked up by the fork 20 and immediately forced into an upper position by uplift bar 28 which guides the loaded balance for a short distance as the platform 10 is rotated. At this point the egg 26 is at the highest point in its travel about the tilted able 10 and he fluid is at the inner end of the counterbalance 19 remote from the fork 20. Only the heaviest grade of eggs will counterbalance the system when the balance 15 is in this position and such eggs drop off into the first compartment E after passing beyond the end of the stabilizing bar 28.

From the above it will be apparent that I have devised an apparatus which attains the objects of my invention. The apparatus is of simple construction, is foolproof in operation, is versatile, and is uniquely adapted for the continuous grading of eggs. It should be understood, however, that other ovoid and/or spherical articles may be graded and classified according to weight by the use of my apparatus and such use is contemplated. Similarly the rotating inclined table with its liquid-counterweighted balances can be used in systems where the article is manually or automatically placed on the apparatus without rolling from a ramp or the like. Similarly boxes, compartments, cages or the like may be substituted for the forks 20.

Although I have described my invention with reference to the embodiment illustrated by the drawing, it should be understood that this is by way of example only and that my invention is not necessarily limited thereto. Accordingly, it is contemplated that modifications in the apparatus and in the mode of using the apparatus, in addition to those proposed above, can be made by those skilled in the art without departing from the spirit and scope of the invention.

What I claim is:

1. An apparatus for weighing and grading ovoid articles comprising in combination a fixed frame, an inclined spindle supported in said frame, means for rotating said spindle, a table carried by the said spindle and adapted to rotate therewith in a plane inclined to the horizontal, radially extending balance arms on said table and having fulcrum supports fixed to said table adjacent the periphery thereof, and adjustable tubular counterweight means on the inner end of each balance arm, the axis of said tubular counterweight means lying along a radius of said table, cradle means on the outer end of each of said balance arms into which an article may be placed, the cradle being depressed thereby to an extent varying with the weight of the article, grading stations arranged about and subjacent to said inclined table to receive the graded articles, and a fluid counterweight medium partially filling each of said tubular counterweights, whereby rotation of said table shifts the effective center of gravity of the counterweight fluid in each counterweight to attain a maximum effective leverarm when the fulcrum of a given balance arm is disposed at the highest point in its orbit about the spindle and to attain the minimum effective leverarm when the said fulcrum of a given balance arm is at its lowest point in its orbit.

2. The apparatus of claim 1 which includes a ramp for delivering articles to each successive cradle as said table is rotated, said ramp discharging at a point near the table adjacent the highest point in the orbit of said fulcrums.

3. In an apparatus for grading articles by weight, a generally circular inclined table, a plurality of balances mounted in an equi-spaced array adjacent to the periphery of said table, each of said balances comprising a weighted lever mounted radially on the table and projected beyond the periphery thereof, tubular counterweight means on each of said levers, each of said tubular counterweight means lying along a radius of said table and being partially filled with a counterweighting liquid, shaft means rotatably supporting said inclined table, drive means for said shaft, and a plurality of juxtaposed grading stations below and adjacent the periphery of the said table, the maximum counterweight of the tubular counterweights plus liquid being obtained when a particular balance has its fulcrum point at the highest point in the rotation of the table and the minimum counterweight effect being obtained when the fluid weighting material flows radially outward within the tubular counterweight toward the fulcrum at its lowest point in its rotation about said shaft.

4. An article weighing and grading apparatus comprising in combination a fixed frame, a vertically inclined spindle supported in said frame, means for rotating said spindle, a disc carried by said spindle and adapted to rotate therewith in a plane inclined to the horizontal, lever arms radiating from said disc and having fulcrums upon the outer edge thereof, and tubular counterweight means on the inner end of each lever arm and lying along a radius of said disc, a cradle mounted on the outer end of each of said arms into which an article is placed so as to depress the cradle to an extent varying with the weight of the article, grading trays arranged about the edge of said inclined disc to receive the grading articles, and a fluid counterweight medium partially filling each of said tubular counterweights, whereby rotation of said disc shifts the effective center of gravity of each counterweight to attain a maximum effective lever arm when the fulcrum of a given lever arm is disposed at the highest point in its orbit about the spindle and the minimum effective lever arm is obtained when the said fulcrum of a given lever arm is at its lowest point in its orbit.

5. The apparatus of claim 4 which includes a ramp for delivering articles to be picked up by each successive cradle as said disc is rotated, said ramp delivering articles at a point adjacent the highest point in the orbit of said fulcrums, and depressor bar means at the final grading station overriding the said counterweights to discharge any ungraded article into the final grading station.

6. A grading apparatus of the class described comprising a stationary support, a table rotatably mounted on said support in a plane inclined with respect to the horizontal balances carried by said rotatable table to weigh and carry articles to be graded according to weight, a plurality of grading stations in a peripheral group on said stationary support, a feeding station in advance of the grading stations, said balances each comprising radially extending beam members, each said beam members having an inner end over said table and an outer end extending beyond the periphery thereof, article-carrying receptacles fixed to the outer ends of said beams, tubular counterweights at the inner ends of said beams and lying along a radius of said table, a fluid weighting material partially filling said tubular counterweights, pivot support means for each of said beams arranged in an annular array, a first depressor bar means adjacent to said feeding station adapted to depress each successive receptacle as it passes thereunder upon rotation of said table, and second depressor bar means adjacent the final grading station and adapted to depress said receptacle as it passes thereunder to discharge any article too light to have been discharged at a previous grading station.

7. An apparatus for grading articles according to weight which comprises a rotatable table, a plurality of beams radially arranged thereon adjacent to the periphery thereof and pivotally attached thereto so that each may swing in a vertical plane about a pivot point as a fulcrum, the fulcrums lying in an annular path concentric to the axis of the table, a receptacle on the inner end of each lever, a hollow counterweight on each lever remote from said receptacle, said counterweights being sufficiently heavy to overbalance the respective empty receptacle, a shiftable quantity of fluid weighting material partially filling each of said counterweights, shaft means for rotating the table, said shaft means being inclined from the vertical and said table being inclined from the horizontal, separate stationary discharge chutes arranged about the table and in register with the receptacles throughout a substantial portion of their path of travel, the said weighting fluid being permitted to flow into remote portions of each counterweight which portions are alternately maximum and minimum distances from the fulcrum.

8. In an apparatus for grading articles by weight, a generally circular table, a plurality of balances mounted adjacent the periphery of said table, each of said balances comprising a weighted lever mounted radially on the table and projecting beyond the periphery thereof, tubular counterweight means on each of said balances, said tubular counterweight means lying along a radius of said table, vertically inclined shaft means supporting said table, drive means for said shaft, and a plurality of grading stations in register with the lower portion of the inclined table, the maximum counterweighting effect of each of the tubular counterweights being obtained when a particular balance has its fulcrum point at the highest point in the rotation of the table and the minimum counterweight effect is obtained when the fluid weighting material flows radially outward of the tubular counterweight toward the fulcrum when the table is at its lowest point in its rotation.

9. A weight grading machine comprising an inclined rotatable table, a plurality of radially disposed levers fulcrumed on said table, an article receiver on the outer end of each lever and a progressively varying counterpoise mounted on the inner end of each lever, said counterpoise being initially adapted to overbalance an article of selected maximum weight, said counterpoise being wholly above said table and having its major axis lying in a vertical plane passing through a radius of said table, and means for rotating said inclined table thereby disposing the fulcrums of said levers in progressively varying orbit to tilt the levers into different angular positions with respect to the plane of said table whereby in one of said positions the weight of the article will overbalance the counterpoise and discharge the article.

10. An egg grading machine comprising a rotatable inclined table, a plurality of radially disposed levers fulcrumed around the circumference of said table, each lever having an egg receiver at the outer end and a progressively varying counterpoise at the inner end capable of initially overbalancing the lever when an egg of selected maximum weight is carried thereon, said counterpoise operating wholly above said table and having its major axis lying in a vertical plane passing through a radius of said table, and means for rotating said table in a plane inclined from the horizontal to place the overbalanced levers in progressively inclined planes corresponding to selected egg weights, whereby in one of said inclined positions the egg weight will overbalance the counterpoise and the egg will discharge at a station on the circumference of the inclined table corresponding to the egg weight.

References Cited in the file of this patent

UNITED STATES PATENTS

| | | |
|---|---|---|
| 1,222,842 | Boyer | Apr. 17, 1917 |
| 1,891,807 | Frost | Dec. 20, 1932 |
| 2,093,338 | Niederer | Sept. 14, 1937 |
| 2,112,823 | Breuilh | Apr. 5, 1938 |
| 2,139,574 | Butterfield | Dec. 6, 1938 |
| 2,355,715 | Edington | Aug. 15, 1944 |
| 2,697,516 | Sneed | Dec. 21, 1954 |